United States Patent [19]
Potter

[11] Patent Number: 6,024,202
[45] Date of Patent: Feb. 15, 2000

[54] DETECTOR METHODS AND APPARATUS

[75] Inventor: Michael Potter, Nr Petersfield, United Kingdom

[73] Assignee: De La Rue International Limited, London, United Kingdom

[21] Appl. No.: 09/009,411

[22] Filed: Jan. 20, 1998

[30] Foreign Application Priority Data

Aug. 13, 1997 [GB] United Kingdom ............... 9717194

[51] Int. Cl.⁷ ...................................... G07D 7/00
[52] U.S. Cl. .................. 194/207; 250/459.1; 250/556
[58] Field of Search ......................... 194/207; 250/556, 250/459.1; 356/71

[56] References Cited

U.S. PATENT DOCUMENTS

| | | | |
|---|---|---|---|
| 4,178,102 | 12/1979 | Riccardi et al. | .......... 250/459 X |
| 4,647,202 | 3/1987 | Kimura et al. | . |
| 4,650,320 | 3/1987 | Chapman et al. | .......... 356/71 |
| 5,039,219 | 8/1991 | James et al. | . |

FOREIGN PATENT DOCUMENTS

| | | |
|---|---|---|
| 0 174 506 A2 | 8/1986 | European Pat. Off. . |
| 0 600 633 A2 | 6/1994 | European Pat. Off. . |
| 0 747 680 A2 | 12/1996 | European Pat. Off. . |
| 0 747 680 A3 | 4/1998 | European Pat. Off. . |
| 849 016 | 9/1952 | Germany . |
| 4438905 A1 | 11/1995 | Germany . |
| WO 91/11703 | 8/1991 | WIPO . |

*Primary Examiner*—F. J. Bartuska
*Attorney, Agent, or Firm*—Oliff & Berridge, PLC

[57] ABSTRACT

A method and apparatus for detecting radiation in a relatively narrow wavelength band within radiation having a wide range of wavelengths. The method comprises detecting radiation in a first wavelength band including the narrow wavelength band and other wavelengths; detecting radiation in a second wavelength band which comprises substantially only the other wavelengths; and comparing the levels of detected radiation to determine the presence of radiation in the narrow wavelength band.

14 Claims, 4 Drawing Sheets

INDIVIDUAL FILTER RESPONSES

COMBINED RESPONSES

EFFECTIVE RESPONSE OF "DIFFERENCE"

DETECTOR METHODS AND APPARATUS

FIELD OF THE INVENTION

The invention relates in one aspect to a method and apparatus for detecting radiation in a relatively narrow wavelength band within radiation having a wider range of wavelengths.

DESCRIPTION OF THE PRIOR ART

There are several applications where it is necessary to detect a particular narrow wavelength band within a wide range of wavelengths. These include elemental analysis techniques and flame detection. In the field of security, use is made of compounds having particular spectral characteristics to authenticate documents and other articles. Examples include documents of value such as banknotes which may carry an ink or have inclusions in the paper or security thread which include a component having a special spectral response. A particularly difficult spectral response to detect and reproduce is one which results in the generation of radiation in a very narrow wavelength band upon stimulation. In this context, by "narrow" we mean typically wavelength bands of 100 nm or less, the wavelengths being typically in the UV, visible or infrared part of the spectrum.

One approach to detecting such a spectral response would be to utilise a detector which can only detect radiation within the specified wavelength band. Typically, this would be by choosing a filter with a pass band corresponding to the spectral response wave band. Suitable glass filters may not exist, however, and so it is necessary to use specially designed interference filters. These are difficult to obtain and are expensive, especially in small quantities, and cannot easily be cut to the shapes required for small detectors.

SUMMARY OF THE INVENTION

In accordance with one aspect of the present invention, a method of detecting radiation in a relatively narrow wavelength band within radiation having a wider range of wavelengths comprises detecting radiation in a first wavelength band including the narrow wavelength band and other wavelengths; detecting radiation in a second wavelength band which comprises substantially only the other wavelengths; and comparing the levels of detected radiation to determine the presence of radiation in the said narrow wavelength band.

In accordance with a second aspect of the present invention, apparatus for detecting radiation in a relatively narrow wavelength band within radiation having a wider range of wavelengths comprises a first detector for detecting radiation in a first wavelength band including the narrow wavelength band and other wavelengths; a second detector for detecting radiation in a second wavelength band which comprises substantially only the other wavelengths; and a processor for comparing the levels of detected radiation to determine the presence of radiation in the said narrow wavelength band.

With this invention, instead of attempting to detect just the narrow wavelength band, radiation is detected in a pair of overlapping wavelength bands, the narrow wavelength band corresponding to those wavelengths which are detected in the first wavelength band but are not detected in the second wavelength band. This enables much cheaper and more readily obtainable filters to be employed.

Conveniently, the upper limit of the first wavelength band substantially corresponds to the upper limit of the second wavelength band. However, other arrangements are possible and, for example, the lower limit of the two wavelength bands may substantially coincide.

The radiation may lie in the visible wavelength range but typically lies outside the visible wavelength range, for example in the infrared or ultraviolet ranges.

Typically, a first signal is generated corresponding to radiation detected within the first wavelength band and a second signal is generated corresponding to radiation generated within the second wavelength band and the comparison step comprises subtracting the second signal from the first signal. Of course, this could be done using either analog or digital processing and the term "signal" should be construed accordingly.

In some cases, it may be necessary to modify one or both of the signals prior to the subtraction step in order to take account of noise and other well known variables. Furthermore, since the detection steps are likely to be spaced apart in time, it will be necessary to temporally offset one signal relative to the other before carrying out the subtraction. This ensures that the two signals which are subtracted relate to the same area of material. This is particularly important when the method is used to inspect material on moving articles or documents.

In some cases, the detectors may only be responsive to wavelengths within the specified wavelength bands. Typically, however, the apparatus includes a number of filters, the filters having pass bands such that each detector receives only radiation in a respective one of the first and second wavelength bands. The detectors will typically comprise photodiodes or the like.

The radiation may be generated from a variety of sources. One such source is a material which generates radiation in response to external stimulation. Typically, the material will be stimulated by irradiating the material with radiation in a continuous manner. This may comprise irradiation in either the visible or invisible wavelength bands. The result of continuous radiation results in a measure of the luminescence of the material but cannot distinguish between fluorescence and phosphorescence and in some cases it is necessary to make that distinction.

The ability to distinguish between fluorescent and phosphorescent radiation is useful not only in the present context but also more generally. We have, therefore, devised a new method in accordance with a third aspect of the present invention for distinguishing between fluorescent and phosphorescent radiation emitted from a material in response to an external stimulation, the method comprising stimulating the material using a modulated stimulation to cause the material to emit fluorescent and/or phosphorescent radiation; sensing radiation emitted by the stimulated material; generating a first signal representing total radiation emitted by the stimulated material; generating a second signal representing radiation emitted by the material with substantially the same modulation as the stimulation; and determining the difference between the first and second signals whereby the second signal represents the presence of fluorescent radiation and the difference between the two signals represents the presence of phosphorescent radiation.

In accordance with a fourth aspect of the present invention, we provide apparatus for detecting radiation in a relatively narrow wavelength band within radiation having a wider range of wavelengths, the apparatus comprising a first detector for detecting radiation in a first wavelength band including the narrow wavelength band and other wavelengths; a second detector for detecting radiation in a second wavelength band which comprises substantially only the other wavelengths; and a processor for comparing the levels of detected radiation to determine the presence of radiation in the said narrow wavelength band.

The invention makes use of the fact that fluorescent radiation responds substantially immediately to the stimulation whereas phosphorescent radiation once initiated decays over a relatively long period and so will not exhibit a modulation similar to that of the stimulation. The first signal therefore represents a measure of the luminescence (fluorescence and phosphorescence); the second signal represents fluorescence alone; and the difference between the two signals represents phosphorescence alone.

This method and apparatus is particularly suitable for use with methods and apparatus according to the first and second aspects of the invention where the material is phosphorescent and has an emission wavelength closely similar to other non-phosphorescent materials.

The material will typically be stimulated by exposing it to radiation having a wavelength in the visible or near-visible region. However, other forms of stimulation such as heat could be used with suitable materials.

Where exposure to radiation in the visible and near-visible region occurs, preferably any reflected radiation is removed prior to generating the first and second signals. This simplifies the construction of the various filters needed for use with the sensor.

It will appreciated that when the two sets of apparatus are used together, the first and second detectors may each constitute also a sensor.

Conveniently, the first signal is generated by averaging the received radiation over a sampling interval; while the second signal may be generated by detecting radiation from the material which has been modulated with substantially the same frequency as the external stimulation, and determining the amplitude of the detected radiation to constitute the second signal.

It should be understood, however, that although the invention is particularly suitable for analogue processing, the generation and use of the first and second signals may be handled digitally using a suitably programmed computer.

BRIEF DESCRIPTION OF THE DRAWINGS

Some examples of methods and apparatus according to the invention will now be described with reference to the accompanying drawings, in which.

DETAILED DESCRIPTION OF THE EMBODIMENTS

Figure 1:
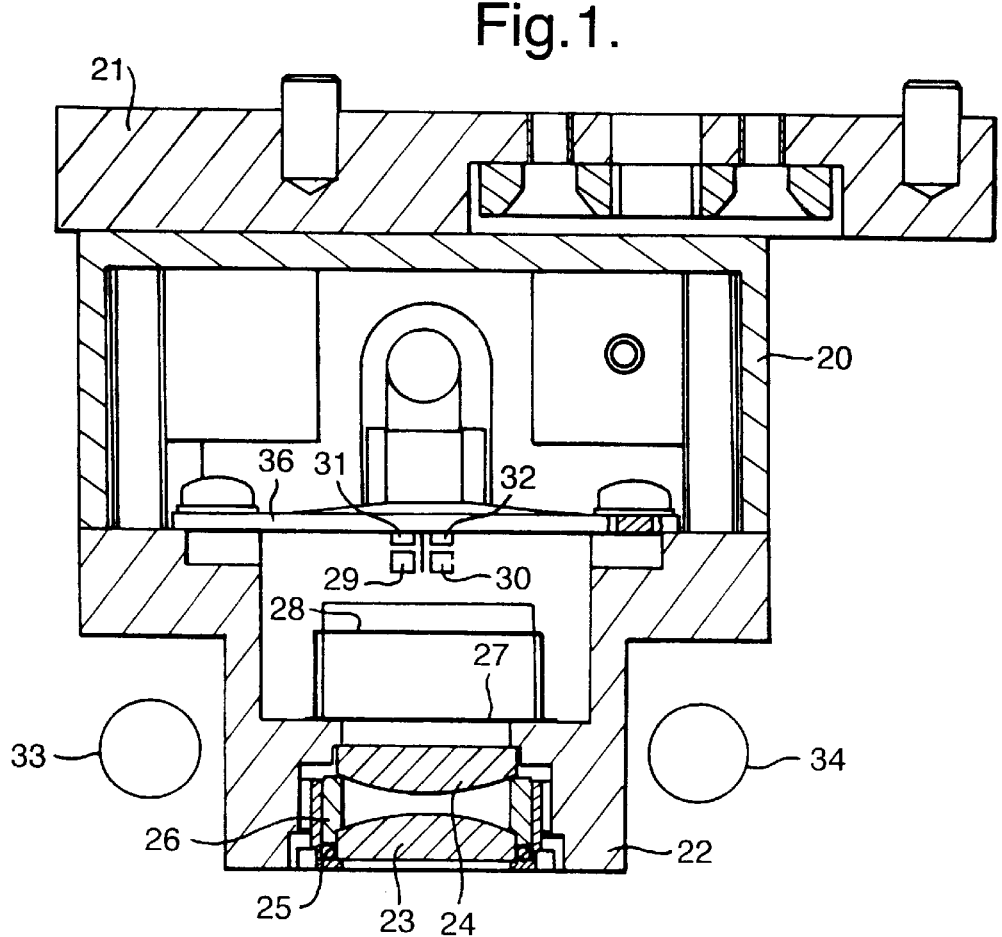
FIG. 1 is a cross-section through a detector head.
Figure 2:
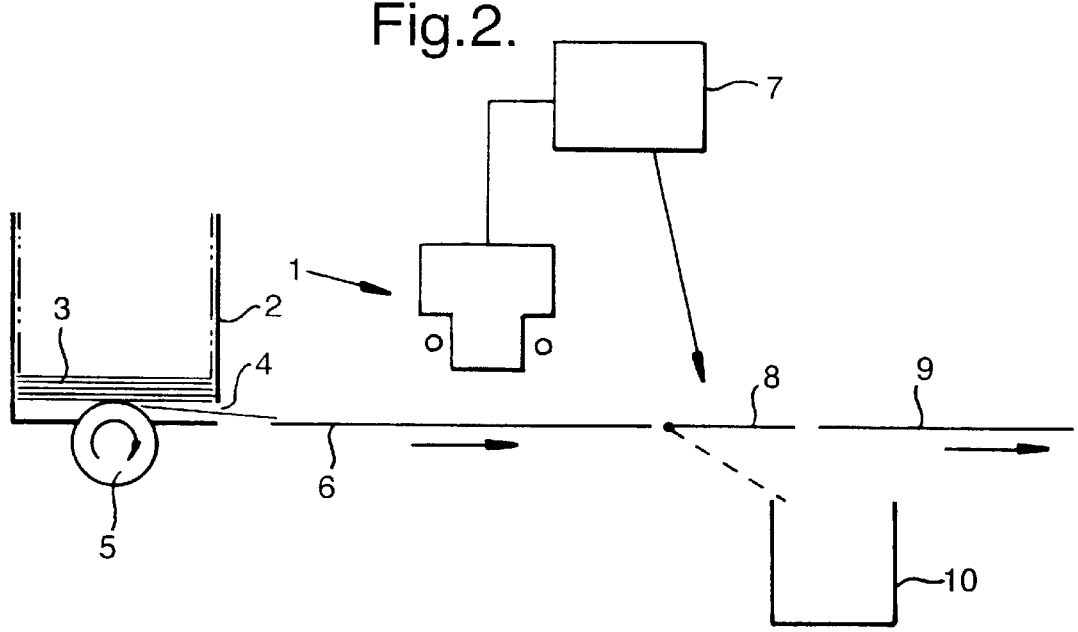
FIG. 2 illustrates banknote sorting apparatus incorporating the detector head shown in FIG. 1.
Figure 3:
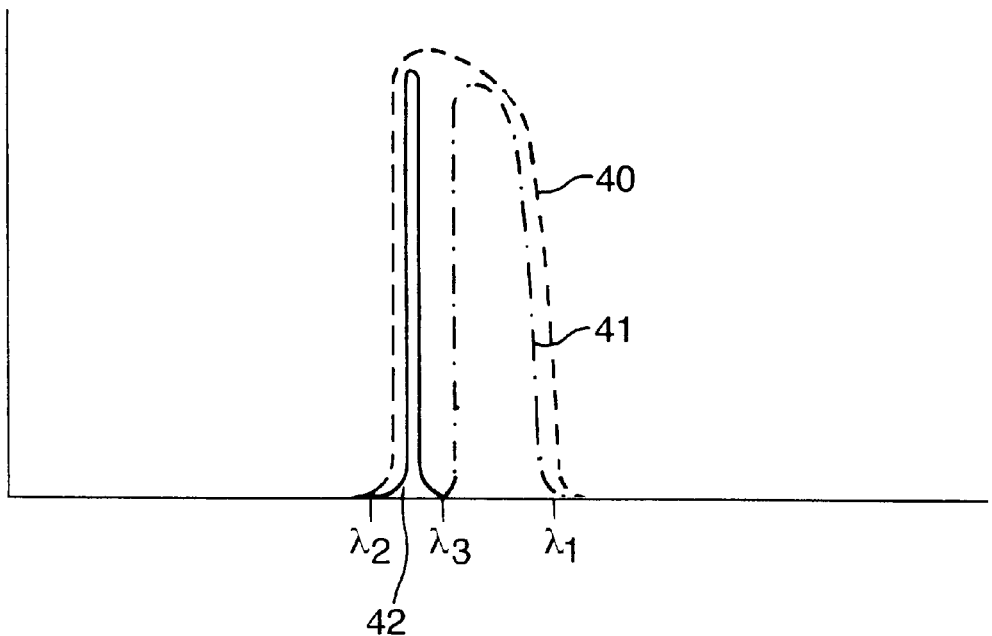
FIG. 3 illustrates the first and second wavelength bands and a narrow band to be detected.

The apparatus shown in FIGS. 1 and 2 is for sorting banknotes between those which are genuine and those which are fraudulent or suspected of being fraudulent. This distinction is made by inspecting each note as it passes under a detector head 1 to see whether an ink emits radiation within a specific narrow wavelength band 42 (FIG. 3) upon illumination. The sorting apparatus includes a hopper 2 in which a stack of banknotes 3 is provided, the hopper 2 having an outlet opening 4 through which individual banknotes are fed upon rotation of a roller 5. The banknotes 4 are fed in any conventional manner, for example via friction belts, vacuum feed devices or the like along a path 6 beneath the detector head 1. The detector head inspects each banknote as will be explained in more detail below and a processor 7 connected with the detector head 1 determines whether or not the narrow band radiation has been detected. The processor 7 then controls a diverter 8 either to allow the banknotes to pass on for further processing along a path 9 when a genuine banknote is detected or to divert a banknote into a reject hopper 10 when a suspected fraudulent banknote is detected.

The construction of the detector head 1 is shown in more detail in FIG. 1 and comprises a housing 20 which is mounted via a support bracket 21 to a casing of the sorting apparatus (not shown). The housing 20 includes a lens housing 22 in which is mounted a pair of focusing lenses 23,24. The lens 23 is sealed to the housing 22 via an O-ring 25 and is held in position by an annular spacer 26. A gelatin filter 27 is provided above the lens 24 to absorb any reflected UV light. Above the gelatin filter 27 is located an IR interference filter 28 which absorbs all wavelengths above a wavelength $\lambda_1$. Light which has passed through the filters 27,28 then impinges on a laterally spaced pair of glass filters 29,30 which are aligned with respective photodiode detectors 31,32. The filter 29 absorbs radiation below about 12 and the filter 30 absorbs radiation below about $\lambda_3$. The effect of these filters in combination is that radiation impinging on the photodiode 31 falls within a first wavelength band 40 (FIG. 3) extending from $\lambda_2$ to $\lambda_1$ while radiation impinging on the photodiode 32 falls within a second wavelength band ranging from $\lambda_3$ to $\lambda_1$. It will be understood that the filters 29,30 have sharp lower cut-offs, the narrow wavelength band 42 of the material to be detected falling between these cut-offs.

A pair of mercury discharge lamps 33,34 are provided, one on each side of the lens housing 22 for illuminating banknotes as they pass beneath the head 1. The illumination wavelength generated by the lamps is chosen to correspond to that which will stimulate the ink, if present, to generate radiation within the narrow wavelength band 42. This may cause the ink to fluoresce or phosphoresce, or both.

Figure 4:
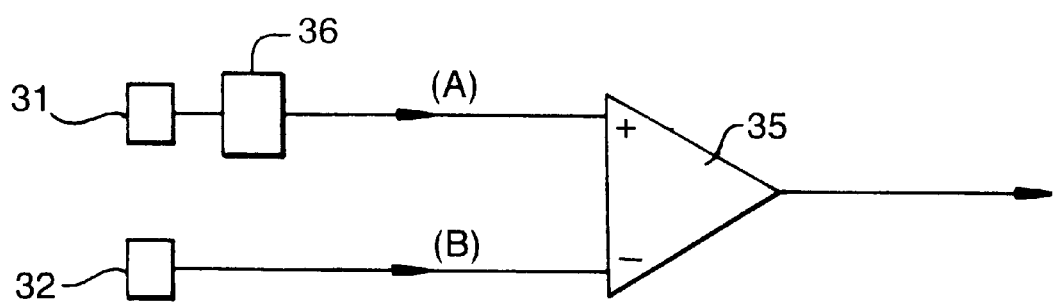
FIG. 4 illustrates a first example of apparatus for processing signals from the detectors.

In order to determine the presence of the special ink, the photodiodes 31,32 are connected to a subtractor 35 (FIG. 4) mounted on a printed circuit board 36. If the signal supplied by the photodiode 31 is labelled A and that from the photodiode 32 is labelled B, the output from the subtractor 35 is A-B. Since the signal A relates to the intensity of radiation received within the wave band 40 and the signal B represents the intensity of radiation within the wavelength 41, the output from the subtractor 35 will represent the intensity of radiation received in the wave band 40 but not in the wave band 41. This difference signal will then be compared with a threshold by the processor 7, after A/D conversion, and if greater than the threshold will indicate the presence of the special ink. If the ink is not present then the processor 7 will cause the diverter 8 to move to the position shown in dashed lines in FIG. 2 and the note will be rejected.

In practice, a delay 36 is built into one of the lines from the photodiodes 31,32 to the subtractor 35 to compensate for movement of the banknote beneath the photodiodes 31,32.

Figure 5:
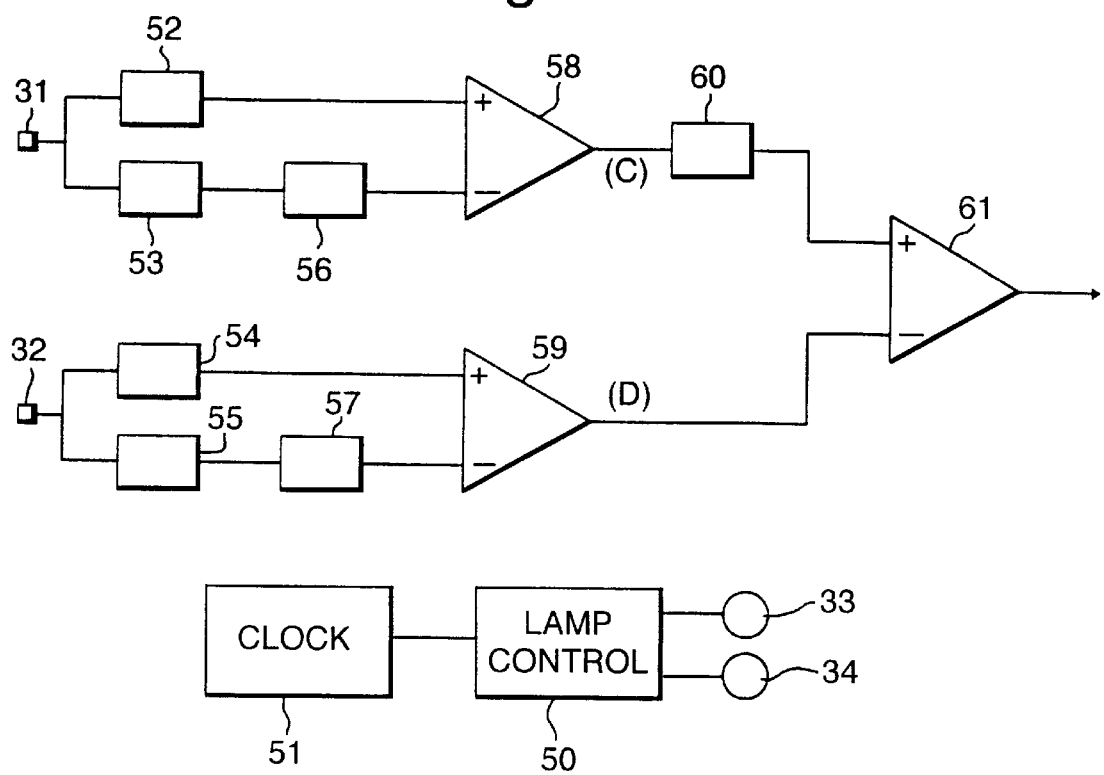
FIG. 5 illustrates a second example of apparatus for processing signals from the detector.

In the example described, the photodiodes 31,32 measure the total luminescence generated by the ink and the lamps 33,34 will be continuously illuminated. In some cases, the ink may phosphoresce within the wavelength band 42. In order to detect this phosphorescence, the radiation due to phosphorescence must be distinguished from that due to fluorescence. FIG. 5 illustrates a circuit-which can make that distinction. In this example, the lamps 33,34 are modulated on and off by a lamp control circuit 50 which responds to a clock input from a source 51. The output from each diode 31,32 is fed in parallel to a respective averaging filter 52,54 and to a respective bandpass filter 53,55. The outputs of the bandpass filters 53,55 are fed to respective amplitude detectors 56,57. The outputs of the averaging filter 52 and the amplitude detector 56 are fed to a subtractor 58 while the outputs of the averaging filter 54 and the amplitude detector 57 are fed to a subtractor 59. The characteristics of the averaging filters 52,54 are such that they only pass frequencies below the modulation frequency of the lamp 50, and so the signals fed to the non-inverting inputs of the subtractors 58,59 represent the received luminescence (phosphorescence plus fluorescence). The characteristics of the bandpass filters 53,55 are such that they pass only frequencies including and close to the modulation frequency of the lamp. Any phosphorescence signal will decay much more slowly and will be substantially eliminated by the filters 53,55 and so the signals fed from the amplitude detectors to the inverting inputs of the subtractors 58,59 represent the received fluorescence.

The amplitude detectors 56,57 are necessary to determine the amplitude of the output generated by the bandpass filters 53,55.

Other processing techniques well known to those skilled in the art may be used. For example, a synchronous detector driven by the clock signal may replace bandpass filter 53 and the amplitude detector 56 or bandpass filter 55 and amplitude detector 57.

Each subtractor 58,59 then subtracts the fluorescence signal from the fluorescent/phosphorescent signal to generate output signals C,D which represent phosphorescence. These signals C,D are then processed in the same way as the signals A,B in FIG. 4 by passing them to a subtractor 61 which generates an output signal representing the intensity of radiation received in the wavelength band 40 but not the wavelength band 41. The signal C is passed to the subtractor 61 via a delay 60 to compensate for movement of the banknotes beneath the photodiodes 31,32.

Figure 6A:
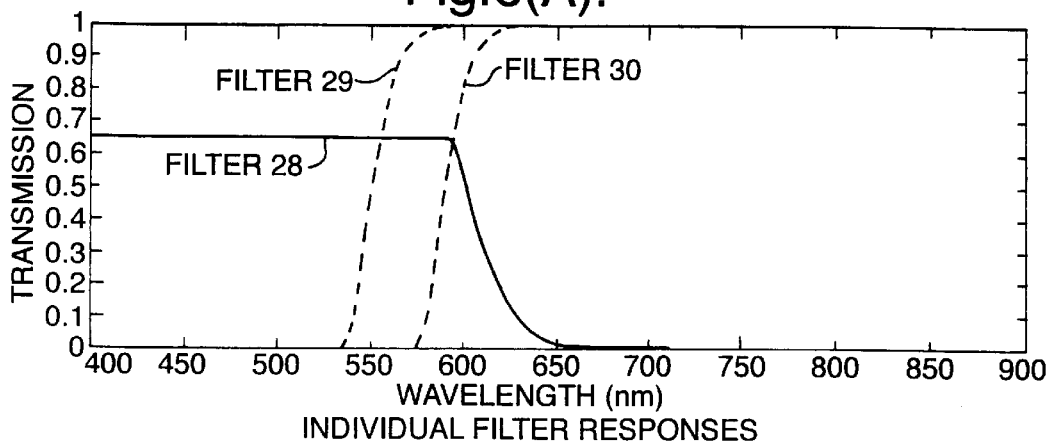
FIGS. 6A through 6B illustrate specific examples of the characteristics of the filters.
Figure 6B:
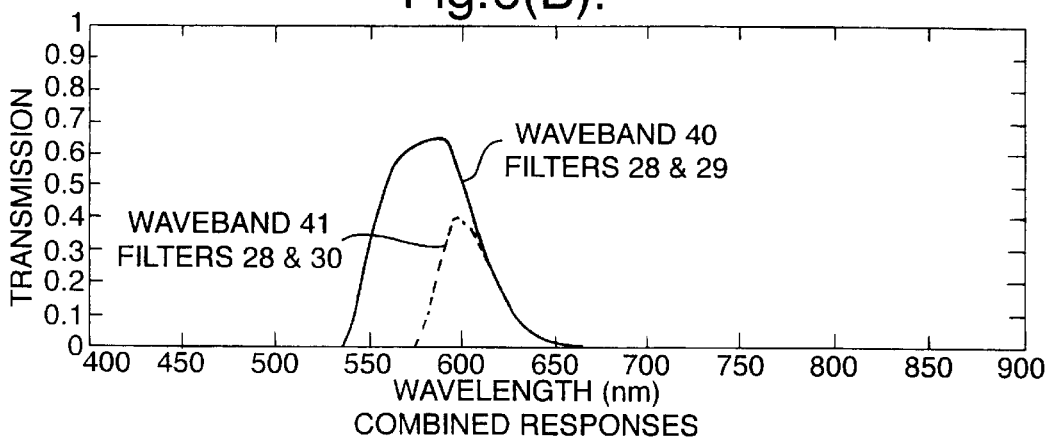
Figure 6C:
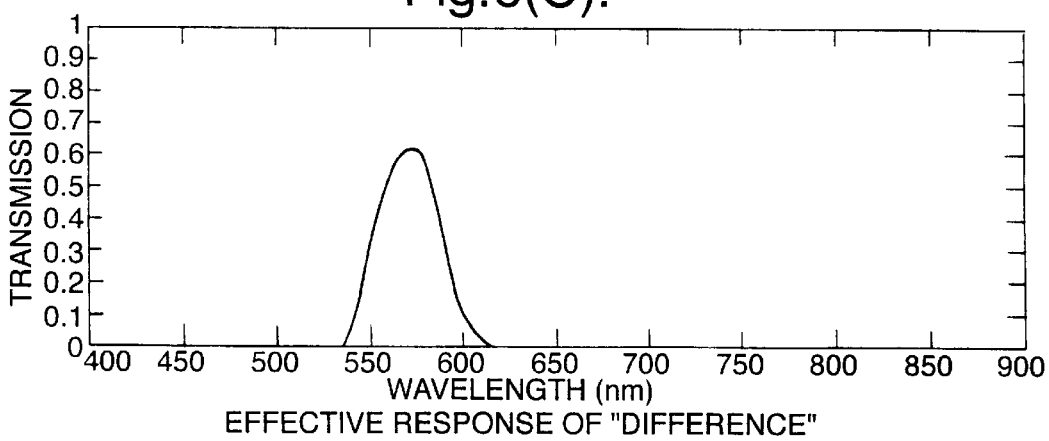
FIG. 6C illustrates the narrow band resulting from subtracting wavelength bands.

FIG. 6 illustrates a specific example of the characteristics of the filters 28, 29 and 30. FIG. 6A illustrates the individual characteristics of those filters while FIG. 6D illustrates the effect of superposing the filters resulting in wavebands 40,41 described earlier. FIG. 6C illustrates the narrow band 42 resulting from subtracting wavelength band 41 from wavelength band 40. It will be noted that the response of the difference extends up into waveband 41. This is inevitable unless the characteristic of filter 30 is infinitely steep—a physical impossibility. The example as shown is suitable for detecting a narrow spike in the region 540 to 570 nm, i.e. between the lower cut-offs of wavebands 40 and 41, which are the same as the lower cut-offs of filters 29 and 30, respectively.

I claim:

1. A method of distinguishing between fluorescent and phosphorescent radiation emitted from a material in response to an external stimulation, the method comprising stimulating the material using a modulated stimulation to cause the material to emit fluorescent and/or phosphorescent radiation; sensing radiation emitted by said stimulated material; generating a first signal representing total radiation emitted by said stimulated material; generating a second signal representing radiation emitted by said material with substantially the same modulation as the stimulation; and determining the difference between said first and second signals whereby said second signal represents the presence of fluorescent radiation and said difference between said two signals represents the presence of phosphorescent radiation.

2. A method according to claim 1, wherein said material is stimulated by exposing it to radiation having a wavelength in the visible or near-visible region.

3. A method according to claim 2, further comprising removing any reflected radiation prior to generating said first and second signals.

4. A method according to claim 1, wherein said first signal is generated by averaging the received radiation over a sampling interval.

5. A method according to claim 1, wherein said second signal is generated by detecting radiation from said material which has been modulated with substantially the same frequency as the external stimulation, and determining the amplitude of said detected radiation to constitute said second signal.

6. A method of detecting radiation in a relatively narrow wavelength band within radiation having a wide range of wavelenths, comprising:

detecting radiation in a first wavelength band including said narrow wavelength band and other wavelengths;

detecting radiation in a second wavelenath band which comprises substantially only said other wavelengths;

comparing the levels of detected radiation to determine the presence of radiation in said narrow wavelength band, wherein the radiation is generated by a material in response to external stimulation;

distinguishing, prior to detecting radiation in the first and second wavelength bands, between fluorescent and phosphorescent radiation emitted from a material in response to an external stimulation, including stimulating the material using a modulated stimulation to cause the material to emit fluorescent and/or phosphorescent radiation;

sensing radiation emitted by said stimulated material;

generating a first signal representing total radiation emitted by said stimulated material;

generating a second signal representing radiation emitted by said material with substantially the same modulation as the stimulation; and determining the difference between said first and second signals whereby said second signal represents the presence of fluorescent radiation and said difference between said two signals represents the presence of phosphorescent radiation.

7. Apparatus for distinguishing between fluorescent and phosphorescent radiation emitted from a material in response to an external stimulation, the apparatus comprising a stimulation source for generating a modulated stimulation to cause the material to emit fluorescent and/or phosphorescent radiation; a sensor for sensing radiation emitted by the stimulated material; and a processor for generating a first signal representing total radiation emitted by the stimulated material, generating a second signal representing radiation emitted by the material with substantially the same modulation as the stimulation, and determining the difference between the first and second signals whereby the second signal represents the presence of fluorescent radiation and the difference between the two signals represents the presence of phosphorescent radiation.

8. Apparatus according to claim 7, wherein said stimulation source generates radiation having a wavelength in the visible or near-visible region.

9. Apparatus according to claim 8, further comprising a filter for preventing any reflected radiation being received by said sensor.

10. Apparatus according to claim 7, wherein said processor includes an averager for averaging the received radiation over a sampling interval to generate the first signal.

11. Apparatus according to claim 9, wherein said processor detects radiation from the material which has been modulated with substantially the same frequency as the external stimulation, and determines the amplitude of the detected radiation to constitute the second signal.

12. Apparatus according to claim 9, wherein said processor includes a bandpass filter for extracting radiation emitted by the stimulated material which has substantially the same modulation frequency as the stimulation; and an amplitude detector connected to the output of said bandpass filter for detecting the amplitude of the signal output by said bandpass filter, the output of the amplitude detector constituting the second signal.

13. Sorting apparatus comprising apparatus according to claim 7; means for feeding articles past said apparatus; and a feed system responsive to output signals from the processor to convey articles to one of a number of destinations depending upon the result of the comparison.

14. An apparatus for distinguishing between fluorescent and phosphorescent radiation emitted from a material in response to an external stimulation, comprising:

a stimulation source for generating a modulated stimulation causing the material to emit fluorescent and/or phosphorescent radiation;

a sensor for sensing radiation emitted by the stimulated material;

a processor for generating a first signal representing total radiation emitted by the stimulated material, generating a second signal representing radiation emitted by the material with substantially the same modulation as the stimulation, and determining the difference between the first and second signals whereby the second signal represents the presence of fluorescent radiation and the difference between the two signals represents the presence of phosphorescent radiation;

a second apparatus for detecting radiation in a relatively narrow wavelength band within radiation having a wider range of wavelengths, the second apparatus comprising a first detector for detecting radiation in a first wavelength band including the narrow wavelength band and other wavelengths;

a second detector for detecting radiation in a second wavelength band which comprises substantially only the other wavelengths; and a second processor for comparing the levels of detected radiation to determine the presence of radiation in the said narrow wavelength band.

\* \* \* \* \*